US008078124B2

(12) United States Patent
Kling et al.

(10) Patent No.: US 8,078,124 B2
(45) Date of Patent: Dec. 13, 2011

(54) ENHANCING ANTENNA PERFORMANCE IN RF DEVICES

(75) Inventors: Ralph M. Kling, Sunnyvale, CA (US); Matthew Miller, Grass Valley, CA (US); Mlchael J. Grimmer, San Jose, CA (US)

(73) Assignee: Crossbow Technology, Inc., Milpitas, CA (US)

( * ) Notice: Subject to any disclaimer, the term of this patent is extended or adjusted under 35 U.S.C. 154(b) by 454 days.

(21) Appl. No.: 12/343,776

(22) Filed: Dec. 24, 2008

(65) Prior Publication Data

US 2010/0159857 A1 Jun. 24, 2010

(51) Int. Cl.
*H04B 1/04* (2006.01)

(52) U.S. Cl. .................................. 455/114.2; 455/127.1

(58) Field of Classification Search ............... 455/114.2, 455/299, 127.1, 91, 575.3, 66, 41, 95; 343/700, 343/702; 320/135
See application file for complete search history.

(56) References Cited

U.S. PATENT DOCUMENTS 6,882,130 B2 * 4/2005 Handa et al. .................. 320/135
7,812,771 B2 * 10/2010 Greene et al. ................ 343/702

* cited by examiner

*Primary Examiner* — Joseph Lauture
(74) *Attorney, Agent, or Firm* — Fenwick & West LLP

(57) ABSTRACT

Method and apparatus for improving RF signal performance of a battery-operated handheld device includes RF isolating the battery from DC-powered circuitry and actively incorporating the battery in RF signal transfers with respect to an RF antenna.

4 Claims, 6 Drawing Sheets

ENHANCING ANTENNA PERFORMANCE IN RF DEVICES

FIELD OF THE INVENTION

This invention relates generally to the field of radio frequency (RF) devices and antennas, and more particularly to incorporating other platform elements such as a battery within the main RF antenna circuitry to enhance overall RF performance while minimizing spurious RF emissions.

BACKGROUND OF THE INVENTION

Cellular devices typically include one or more processors for general and specialized computing tasks, and one or more radios for communication tasks. Other sub-systems may include displays, input/output devices, sensors and GPS. A key constraint of such devices is the small form factor desired by users that complicates specifically the design of the RF subsystems. Antennas need a certain physical size related to the wavelengths they receive or transmit to be effective. Close proximity of other platform elements such as circuit boards, batteries, shielding, and the like can severely impair RF performance. In addition, such proximity also increases undesired RF coupling from the antenna back into the device which can lead to unacceptable spurious radio emissions outside the desired operational frequency bands.

Traditionally, antennas are designed with their surroundings in mind, specifically preexisting passive ground planes. The antenna should be tuned to the presence of such ground planes to operate effectively. Thus, antenna designs that include other non-RF platform components, such as batteries, can be desirable to accommodate surrounding components confined within restricted volumes of handheld and portable devices.

SUMMARY OF THE INVENTION

In accordance with one embodiment of the invention, nontypical platform components such as unrelated circuit boards and batteries are incorporated into the active RF antenna design. This forms a compound antenna including the main RF antenna and other "parasitic" antennas coupled with it. While such a system is very complex to model and design, it provides a major tangible benefit of enabling significantly enhanced RF performance in a very small form factor that would otherwise not be achievable. Furthermore, proper tuning of such compound antenna can be used to substantially reduce undesired coupling and spurious emissions. The resulting design of space-constrained RF antenna system achieves antenna performance such as in cellular handsets that would be achievable only in a larger device. The RF design embodied in the present invention is fundamentally better suited to find the optimal RF design point than is possible using a more traditional design approach of regarding non-RF platform components purely as passive components. In addition, an embodiment of the present invention provides a more uniform antenna RF radiation pattern that is desirable in many applications where RF antenna orientation is severely limited.

DETAILED DESCRIPTION OF THE INVENTION

In one embodiment of the present invention, non-RF components such as a battery serve as secondary radiators (and receivers) of RF signal in conjunction with one or more primary RF antennas. For example, the lithium-ion battery that powers a handheld device is utilized as a secondary RF component.

Typically, especially in cellular handset-type designs, the battery takes up a significant portion of the device's overall volume. Positioning the active RF antenna in relation to the battery position is problematic because the battery tends to attenuate a significant amount of RF energy, thus diminishing the effectiveness of the antenna. This can be detrimental to cellular device certifications that require an efficient antenna design to meet minimum over-the-air performance criteria.

In accordance with one embodiment of the present invention, the battery is co-located with the main RF antenna, as usually required in handset designs because of space constraints, and is designed to act as a secondary radiator of RF signal. In this embodiment, the battery is connected to the system's ground plane for DC circuitry but is isolated from the ground plane for RF circuitry. This can be accomplished using various types of conventional RF filters and transmission-line segments as RF isolators. Furthermore, a dedicated wire loop in the main battery power path accomplishes both RF coupling with the main antenna and also RF decoupling from the ground plane. Thus, the battery, that reduces antenna effectiveness in conventional circuit designs, is an active component that increases antenna performance in accordance with the present invention.

In addition, RF isolators such as the filters and transmission lines described above for isolating the battery from the ground plane for RF purposes are naturally frequency sensitive and can be tuned to a particular resonant frequency. This facilitates tuning as a secondary antenna to the desired RF frequencies for receive and transmit (i.e., transceiver) operations, and at the same time de-tuning the system to significantly reduce spurious emissions that are detrimental to system performance.

Figure 1A:
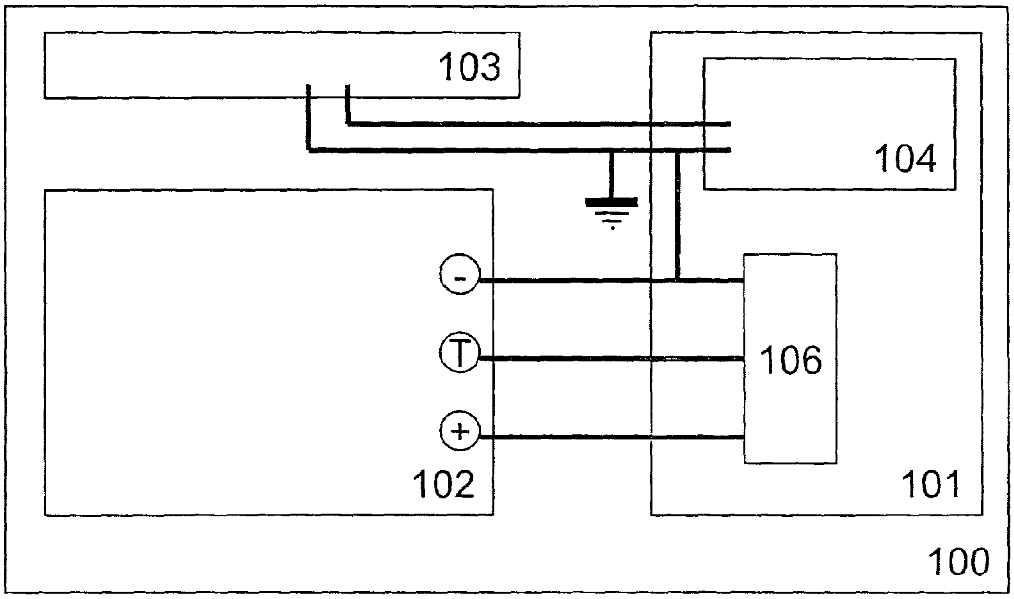
FIG. 1*a* is a simplified block diagram of the physical layout of circuit components within a typical handheld device.
Figure 1B:
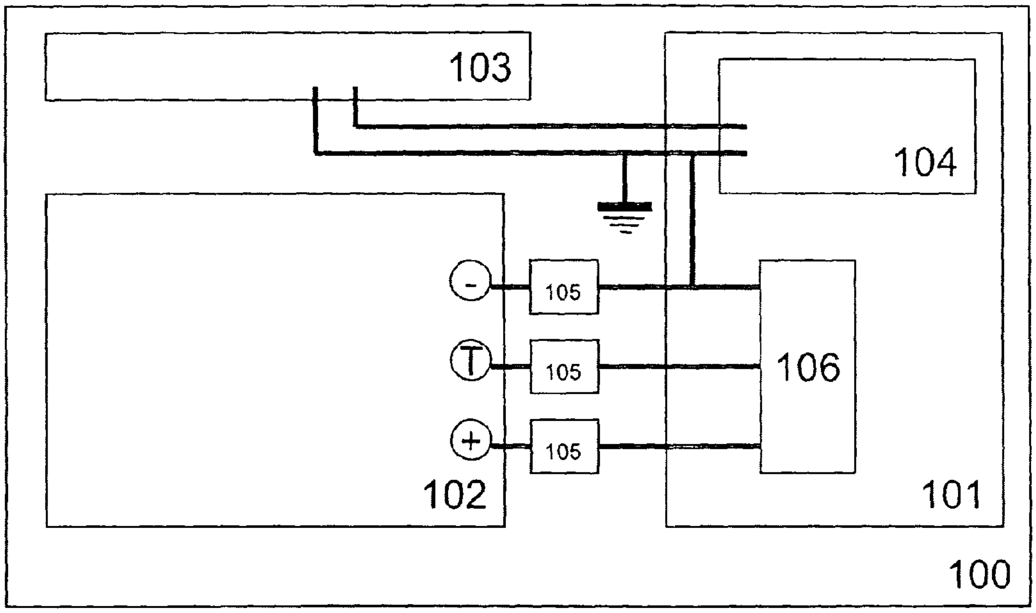
FIGS. 1*b, c* are modified block diagrams of the circuit components of FIG. 1*a* in accordance with embodiments of the present invention.
Figure 1C:
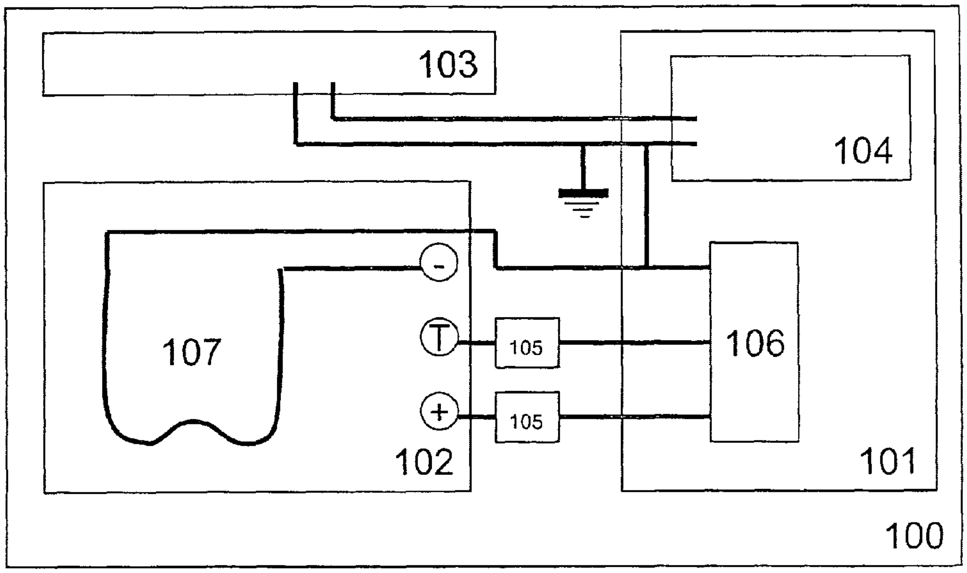

Referring now to the simplified block diagrams of FIG. 1*a-c*, there are shown simplified physical layouts of circuit components in embodiments of a handheld transceiver device according to the present invention. These circuit components commonly include the RF base platform 100, the main logic board 101 containing the processor, memory, display and other components necessary to provide the desired functionality (e.g., of a cellular hand set), including the battery 102, the RF signal transmit and receive antenna 103, the RF circuitry 104 and various other components such as battery charger 106. Particular embodiments of the present invention as illustrated in FIGS. 1*b, c* may contain a plurality of such modules, e.g., multiple antennas for different RF bands, RF filters or isolators 105, and an RF coupling loop 107 in the battery circuit.

Figure 2:
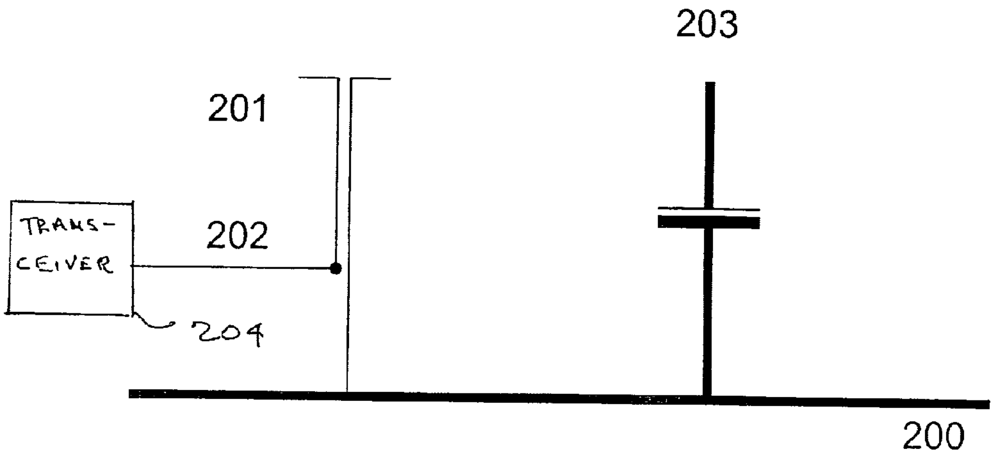
FIG. 2 is a simplified schematic circuit illustrating antenna, battery and ground plane connections with respect to DC.

As illustrated in FIG. 2, the simplified schematic diagram of a standard handheld transceiver device includes a battery 203 that is DC connected (shown simplified for clarity) to a circuit board 200 of integrated circuits and miniature electrical components that also incorporates a ground plane. A typical RF antenna 201 that receives or transmits RF signals includes a connection 202 to transceiver circuitry 204 of the handheld device, and is referenced at one end (e.g., at ¼ wavelength) to the ground plane on the circuit board 200. The opposite end of the antenna 201 is open to radiate (or receive) RF signals relative to the ground plane. The battery 203 is fully DC-connected (not shown) to numerous electrical components on the circuit board 200 in conventional manner.

Figure 3:
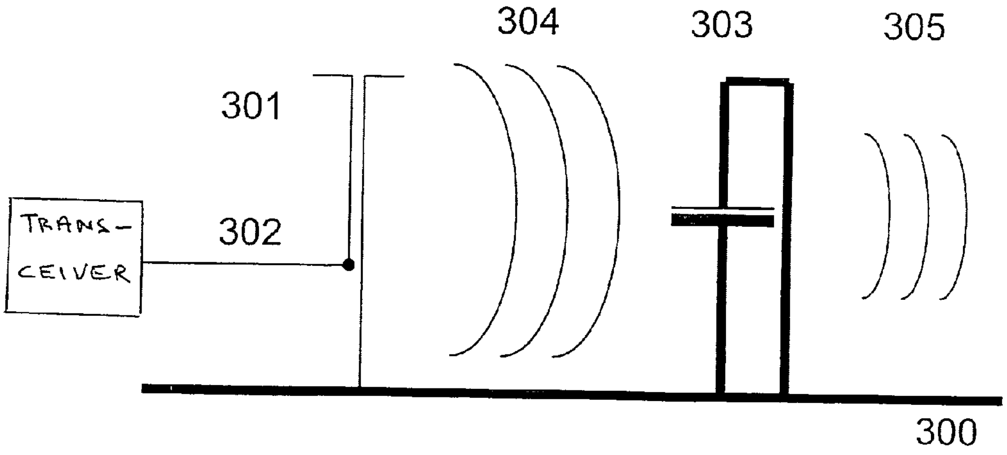
FIG. 3 is a simplified schematic diagram illustrating typical RF characteristics of the circuit components illustrated in FIG. 2.

In operation, as illustrated in the simplified schematic diagram of FIG. 3, the circuit of FIG. 2 has different RF electrical characteristics than its DC electrical characteristics. For example, the antenna 301 ideally transmits the RF energy it receives from its feed point 302 to the air 304 without shorting any of the signal to ground 300 or reflecting it back into the feed. Similarly, in receive mode, RF energy is collected from the air and directed towards a transceiver at the end of the feed 302. However, from an RF perspective, the entire battery 303 acts like a ground plane attenuating RF signal 305 that attempts to pass by.

Figure 4:
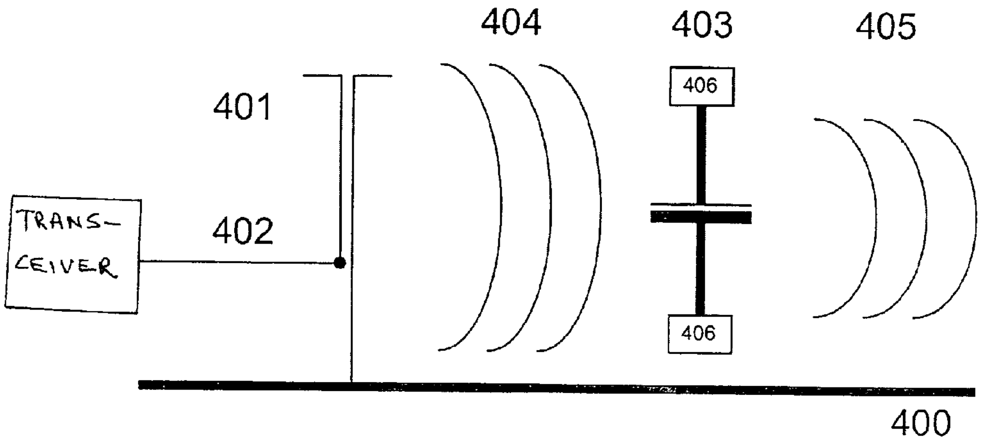
FIG. 4 is a simplified schematic diagram of circuit components as illustrated in FIG. 2 in modified RF connection incorporating the battery in accordance with one embodiment of the present invention.

In accordance with one embodiment of the present invention, as illustrated in the simplified RF circuitry of FIG. 4, the battery 403 is isolated 406 from the ground plane for RF operation (but remains connected thereto for DC operation). This results in a diminished attenuation of RF signal 404, 405 radiating by the battery 403. As an isolated conductive component, the battery 403 intercepts radiated RF signal 404 and secondarily radiates 405 the intercepted RF signal at combined greater signal strength than would be possible with the battery connected to ground for RF as well as for DC operations.

Figure 5:
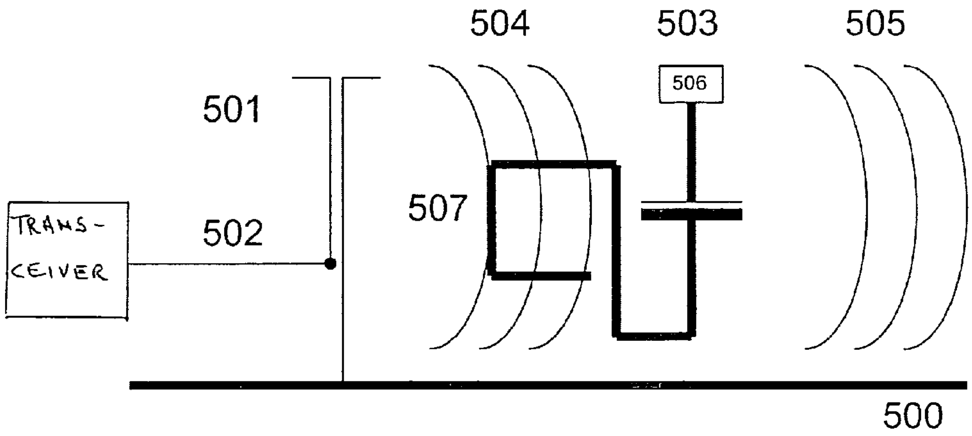
FIG. 5 is a simplified schematic diagram of an embodiment of the present invention incorporating the battery as an active component in an RF antenna circuit.

Referring now to FIG. 5, there is shown another embodiment of the present invention in which the battery 503 is RF isolated 506, through DC connected, and its capacitance relative to its conductive surroundings including the ground plane on circuit board 500 is connected for interaction with an active or inductive loop 507 (similar to loop 107 in FIG. 1). This enables resonant coupling of emitted signal 504 with the combined inductance of loop 507 and capacitance of battery 503. Since the battery 503 is isolated 506 from the ground plane on circuit board 500 for RF operation and is actively involved in signal re-transmission of RF signals from (and to) the antenna 501, the attenuation of RF signals 505, 504 by the battery 503 is significantly reduced for greater overall antenna efficiency. Similar benefits result from the battery 503 connected in this manner during receive mode on incoming RF signals 505 not being significantly attenuated 504, and being coupled to the antenna 501.

Figure 6:
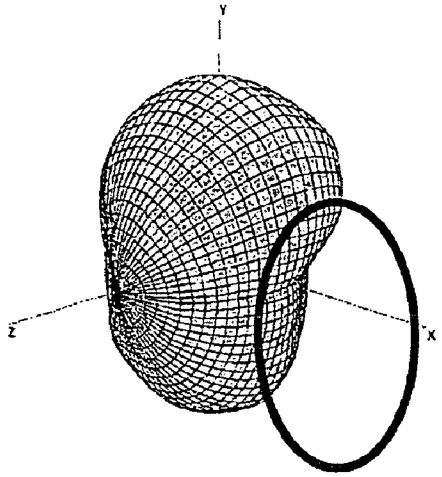
FIG. 6 is a graph illustrating typical field strengths about a conventional RF antenna in a handheld device.

Referring now to the graph of FIG. 6, there is shown the RF transmission strengths of a conventional cellular handset along three orthogonal axes. Regions close to the center exhibit low transmission strengths while regions distant from the center exhibit higher strengths. The overall transmission strength is low and its uniformity along the three orthogonal axes is poor. In particular, the lower right of the graph that points in the x direction where the battery is placed (oval marker) shows low signal strength and poor uniformity. A similar picture applies to sensitivity to received RF signals.

Figure 7:
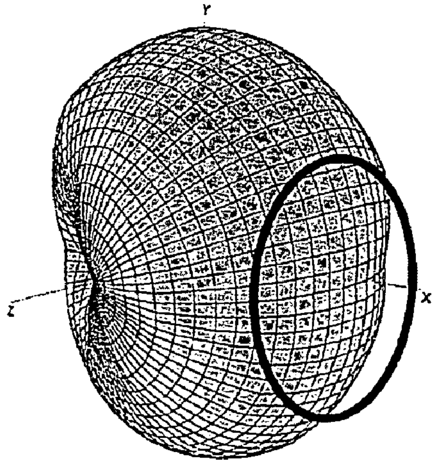
FIG. 7 is a graph illustrating field strengths about an RF antenna designed in accordance with the present invention to incorporate the battery of a handheld device into the RF circuitry.

In accordance with an embodiment of the present invention, the graph of FIG. 7 illustrates the RF transmission signal strength (and similarly the RF signal reception sensitivity) along three orthogonal axes for a handheld device embodying the present invention. As in FIG. 6, regions close to the center exhibit low RF signal strength and regions further from the center exhibit higher RF signal strength. Significantly, the overall signal transmission strength is higher and its uniformity along three orthogonal axes is greatly improved. In particular, lower right portions of the graph (i.e., along the direction aligned with battery placement, as depicted by the oval) exhibit negligible degradation of RF signal strength and uniformity. A similar graph (not shown) illustrates RF signal reception sensitivity, including along the direction aligned with battery placement.

Therefore, active incorporation of passive electrical components such as batteries into RF transmission and reception circuitry in handheld devices greatly improves uniformity of RF signal transmission strength or RF signal reception sensitivity. In addition, an active inductive loop incorporated with capacitance of the battery to its conductive surroundings promotes resonant coupling between battery and antenna for secondary emission and combined antenna efficiency during transmission or reception of RF signals.

What is claimed is:

1. An electronic apparatus including circuits operating at radio frequencies (RF), comprising:

an antenna configured to send or receive a RF signal;

a direct current (DC) source for powering the circuits, the DC source having capacitance;

a plane of reference potential coupled to the antenna, the circuits and the DC source;

an inductive loop connected to the DC source for forming an RF resonant circuit in conjunction with the capacitance of the DC source, the RF resonant circuit configured to re-radiate the RF signal between the DC source and the antenna; and an RF isolator between the DC source and the circuits connected to the plane.

2. The electronic apparatus according to claim 1 in which the RF resonant circuit is positioned relative to the plane and the antenna for resonant RF coupling between the antenna and RF resonant circuit.

3. The electronic apparatus according to claim 2 in which the DC source as a component of the RF resonant circuit re-radiates the RF signal between the DC source and the antenna.

4. A method of improving radio frequency (RF) signal performance of a portable device having RF circuits that include an antenna and that are battery powered, the method comprising:

RF isolating DC connections between a battery and the RF circuits, the battery having capacitance;

incorporating an inductive loop with the battery to form an RF resonant circuit; and positioning the battery and antenna in RF resonant interaction for re-transmitting RF signals between the antenna and the RF resonant circuit.

* * * * *